Feb. 12, 1924.                     1,483,443
G. F. HOGAN
ENVELOPE
Filed June 14, 1922
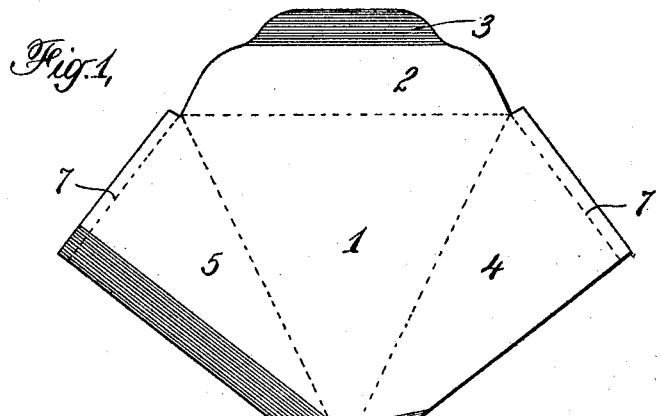
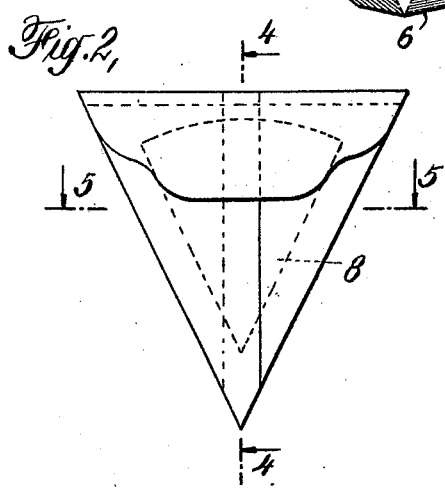
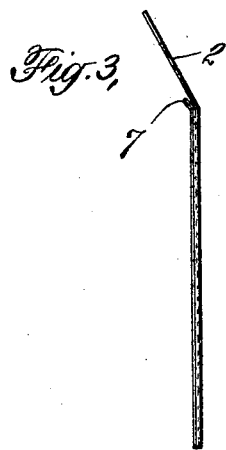
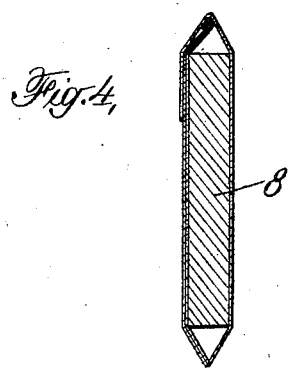
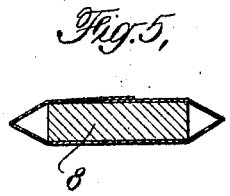
INVENTOR
GEORGE F. HOGAN
BY
*Pennie Davis Marvin & Edmonds*
ATTORNEYS.

Patented Feb. 12, 1924.

1,483,443

UNITED STATES PATENT OFFICE.

GEORGE FRANCIS HOGAN, OF CHICAGO, ILLINOIS.

ENVELOPE.

Application filed June 14, 1922. Serial No. 568,121.

*To all whom it may concern:*

Be it known that I, GEORGE F. HOGAN, a citizen of the United States, residing at Chicago, in the county of Cook, State of Illinois, have invented certain new and useful Improvements in Envelopes; and I do hereby declare the following to be a full, clear, and exact description of the invention, such as will enable others skilled in the art to which it appertains to make and use the same.

It is the object of the present invention to provide an envelope or container for holding a confection and particularly a sector-shaped confection such as a piece of pie. This may be ordinary pie, though the envelope is particularly constructed for holding a sector of ice cream shaped like a seventh of an ordinary pie, and, if desired, having a filling of fruit between two layers of ice cream with or without a chocolate covering.

To render the envelope or container particularly suitable for use in this way, the paper of which it is composed is rendered substantially grease-proof and water-proof and the envelope itself is cut and folded and pasted or gummed in such manner as to be substantially airtight, thereby protecting the confection from dirt and also, when ice cream is embodied in the confection, reducing the danger of melting.

Other objects and advantages will become clear from the following detailed description, taken in conjunction with the accompanying drawings, wherein—

Fig. 1 shows the flat paper blank ready for folding into an envelope.

Fig. 2 shows the completed envelope with a piece of pie therein.

Fig. 3 is a side elevation to show the position of the front and back flaps; and Figs. 4 and 5 are sections on the lines 4—4 and 5—5 respectively.

In the embodiment illustrated, the envelope is first cut to about the form shown in Fig. 1, with a triangular front 1 having at its upper edge a flap 2 gummed as at 3. Integral with the front 1 are wings 4 and 5, substantially identical in contour and each of triangular shape except for a diagonal cut 6 at the lower corner. These wings are gummed as shown in Fig. 1. Integral with each of the wings 4 and 5 is a small flap 7, the function of which is set forth more at length hereinafter. The wings are so proportioned that when they are folded back upon the front wall 1 their edges will overlap, and as shown more clearly in Fig. 2 the edges will lie parallel throughout their length. The diagonal cut made at the tips of the wings near the apex of the triangular wall 1 permits of folding of the wings to produce this result without leaving any portion of either wing extending beyond the perimeter of the front wall. The cut is at such an angle that the edge of the wings at this point will lie along the lateral edge of the front wall when the wings are in their folded position. Consequently, when the blank is folded to produce the envelope its outlines are triangular and the wings will overlap for a considerable extent throughout their length, thus insuring a broad area of contact by which the two may be gummed or otherwise secured together.

The blank of Fig. 1 is shaped into an envelope by folding in wing 4 and then folding in wing 5, which overlaps as indicated in the drawing. The overlapped portions of the wings are pasted or gummed together throughout their entire length, partly to prevent the entrance of dirt into the package, partly to prevent possible leakage of moisture from the contents of the package and partly to exclude air and thereby reduce the danger of melting a frozen confection. The envelope is then in the form shown in Fig. 2 and ready for the introduction of the confection. Such an envelope is particularly useful as the enclosure for one-seventh of a pie, when the upper and lower crusts are ice cream and the filler is fruit or the like. For instance, the whole pie after being thoroughly frozen, can be dipped in chocolate and then cut into sevenths and such a piece of pie when sealed up in the envelope is protected in sanitary manner. The paper is preferably treated to render it grease-proof and water-proof with any appropriate impregnating agent, such for instance as paraffin.

After the piece of pie 8 has been slipped into the envelope, the gummed flap 2 is folded over and stuck to the back of the envelope, and when this operation is carried out, the narrow back flap formed by the integral extensions 7 of the two wings 4 and 5 will be folded down underneath to form a substantially airtight joint. This is of importance not only in keeping the confection clean, but also in excluding air. The gummed lower corner of wing 4 adheres to the part 1 and so seals the lower tip of the envelope.

The envelopes can be made in various sizes and are suitable as containers for ordinary New England pie, but when used with a frozen confection, their conical shape is of advantage, for the confection may be held in the paper cone while being eaten without the danger that drippings from the ice cream will run down through the bottom of the cone. The pasting or gumming of the longitudinal back seam is carried to the extreme lower point of the envelope so that the envelope is substantially watertight at that point.

These envelopes are inexpensive and when filled with sectors of pie can be packed together with economy of space within a circular metal can, this being of importance when the envelopes are filled with a frozen confection and must be kept at freezing temperature until distributed.

Changes in the details of the envelope may be made without departing from the spirit of the invention, as defined by the appended claims.

I claim:—

1. A triangular envelope of paper comprising a triangular front wall having wings extending from the lateral edges thereof, these wings being substantially in the form of triangles with their apices cut off at an angle, and being adapted to be folded back upon the front wall with their free lateral edges lying substantially parallel and in overlapping relation, sealing means for holding these edges of the wings together, a flap projecting from the base margin of the front wall adapted to be folded over the margin and sealing means on the flap to hold it to the overlapping wings whereby to seal the envelope.

2. A triangular envelope of paper comprising a triangular front wall having wings extending from the lateral edges thereof, these wings being substantially in the form of triangles with their apices cut off at an angle, and being adapted to be folded back upon the front wall with their free lateral edges lying substantially parallel and in overlapping relation with all portions of these edges lying within the perimeter of the front wall, means on the wings for securing these edges together, an extension on each wing adapted to project beyond the base line of the front wall when the wings are folded, a flap extending beyond the end of the front wall and adapted to be folded down so as to overlie the folded wings, and to bend back the extensions on the wings, and means on the flap for securing it to the wings with the extensions bearing against its under side whereby to seal the envelope.

3. A triangular envelope of paper comprising a triangular front wall having substantially triangular wings extending from its lateral edges, these wings being adapted to be folded back upon the front wall with their free edges lying in substantially parallel and overlapping relation, the tips of the wings near the apex of the front wall being cut off at an angle such that the edges of the wings at the tips will lie along the edges of the front wall when the wings are in folded position, sealing means for securing the free edges of the wings together throughout their extent, a flap extending from the base of the front wall and adapted to be folded over upon the wings, extensions from the wings extending beyond the line of folding of said flap and adapted to be folded back with the flap and to bear against the under side thereof, and sealing means on the flap for securing the free edge thereof to the folded wings.

In testimony whereof I affix my signature.

GEORGE FRANCIS HOGAN.